(12) United States Patent
King et al.

(10) Patent No.: US 7,497,613 B2
(45) Date of Patent: Mar. 3, 2009

(54) PROBE WITH EMBEDDED HEATER FOR NANOSCALE ANALYSIS

(75) Inventors: William P. King, Atlanta, GA (US); Mike Reading, Norwich (GB)

(73) Assignee: Anasys Instruments, Santa Barbara, CA (US)

( * ) Notice: Subject to any disclaimer, the term of this patent is extended or adjusted under 35 U.S.C. 154(b) by 0 days.

(21) Appl. No.: 11/405,772

(22) Filed: Apr. 18, 2006

(65) Prior Publication Data

US 2006/0254345 A1    Nov. 16, 2006

Related U.S. Application Data

(60) Provisional application No. 60/672,270, filed on Apr. 18, 2005.

(51) Int. Cl.
*G01K 1/00* (2006.01)
*G01K 13/00* (2006.01)
*G01N 23/00* (2006.01)
*G11B 3/00* (2006.01)

(52) U.S. Cl. .............. 374/141; 374/117; 374/164; 369/154; 250/306

(58) Field of Classification Search ........... 374/141, 374/117–119; 73/105, 146, 579
See application file for complete search history.

(56) References Cited

U.S. PATENT DOCUMENTS

| 5,441,343 | A | | 8/1995 | Pylkki et al. | |
| 5,969,238 | A | * | 10/1999 | Fischer | 73/105 |
| 6,101,164 | A | * | 8/2000 | Kado et al. | 369/126 |
| 6,249,747 | B1 | * | 6/2001 | Binnig et al. | 702/33 |
| 6,532,680 | B2 | * | 3/2003 | Braasch et al. | 33/702 |
| 6,647,766 | B2 | * | 11/2003 | Despont et al. | 73/105 |
| 6,923,054 | B2 | * | 8/2005 | Liu et al. | 73/204.27 |
| 6,932,504 | B2 | | 8/2005 | Takahashi et al. | |
| 7,036,357 | B2 | * | 5/2006 | Adderton et al. | 73/105 |
| 7,054,257 | B2 | * | 5/2006 | Binnig et al. | 369/126 |
| 7,260,051 | B1 | * | 8/2007 | Rust et al. | 369/126 |
| 2006/0272399 | A1 | * | 12/2006 | Su et al. | 73/105 |
| 2006/0284774 | A1 | * | 12/2006 | Salsman | 343/703 |
| 2007/0114401 | A1 | * | 5/2007 | King et al. | 250/309 |
| 2007/0158554 | A1 | * | 7/2007 | Kobayashi et al. | 250/309 |
| 2007/0193347 | A1 | * | 8/2007 | Bradshaw et al. | 73/104 |
| 2008/0072682 | A1 | * | 3/2008 | Liu et al. | 73/756 |

OTHER PUBLICATIONS

C.C. Williams and H.K. Wickramasinghe, Scanning Thermal Profiler, Appl. Phys. Lett. 49, (23), Dec. 8, 1986, pp. 1589-1589.

(Continued)

*Primary Examiner*—Gail Verbitsky
(74) *Attorney, Agent, or Firm*—Mark Rodgers (57) ABSTRACT

The invention is a heated thermal probe suitable for use in micro-thermal analysis or other high resolution thermal measurements and actions. The probe is, in the preferred embodiment, a microfabricated cantilever with a sharp probe tip of a type used in Scanning Probe Microscopes (SPM's) which further includes an integral resistive heating element. The heating element is formed by doping regions of the cantilever with an ion implant process to make lower resistance connections and a higher resistance heating element. There is no spatial overlap between the base of the probe tip and the heating element or conductors.

8 Claims, 8 Drawing Sheets

OTHER PUBLICATIONS

H. M. Pollock and H. Hamiche, Micro-Thermal Analysis: Techniques and Applications. Topical Review, J. Physics D.: Appl Phys 34, R-23 - R-43 (2001) pp. 1-5.

P. Vettiger et al, The "Millipede"—One Thousand Tips for Future AFM Data Storage, IBM J. Res. Develop., vol. 44, No. 3, May 2000, pp. 323-339.

Benjamin W. Chui et al, Low-Stiffness Silicon Cantilevers with Integrated Heaters and Piezoresistive Sensors for High Density AFM Thermomechanical Data Storage, Journal of Microelectromechanical Systems. vol. 7. No. 1, Maech 1998, pp. 69-78.

A. Majumdar, Scanning Thermal Microscopy, Annu. Rev. Mater. Sci., 1999. 29:505-85, pp. 505-586.

* cited by examiner

Doping Masks

Base of tip must be immediately adjacent to but not overlapping heater. This is critical for cantilever operation North/south alignment between two doping steps is critical. Left/right symmetry is critical.

Doping 1 – low doping
Allow legs to be doped.

Doping 2 – high doping
Only legs to be doped

Tolerance should be at least 0.5 microns for Mask and 1 micron for Tool

Fig. 8

PROBE WITH EMBEDDED HEATER FOR NANOSCALE ANALYSIS

RELATED APPLICATIONS

This application claims priority to U.S. provisional application, Ser. No. 60/672,270, filed Apr. 18, 2005.

FEDERALLY SPONSORED RESEARCH

Not Applicable

SEQUENCE LISTING

Not Applicable

BACKGROUND OF THE INVENTION

This invention relates to probes for high resolution thermal analysis, and in particular a cantilever probe with an integral heating element.

The family of thermal analysis techniques, collectively called micro-thermal analysis (micro-TA), has been in existence for nearly a decade now. Micro-TA methods are based on a scanning probe microscope in which the conventional passive probe, typically a cantilever arm with integral tip, is enhanced to measure temperature and be resistively heated. This type of scanning probe microscopy (SPM) is called scanning thermal microscopy (SThM, specifically in this application, SThM in which the probe is actively heated rather than the sample). This form of microscopy allows thermal properties such as thermal conductivity and diffusivity to be mapped on a sub-micron scale. The heated probe will cause highly localized surface effects due to temperature. Used with an SPM, which is extremely sensitive to height variations, measured by changes in the deflection of the cantilever probe, heating the surface will cause cantilever deflections due to local thermal expansion or material softening or both. Additionally, the amount of power fed to the heater can be plotted independently or compared to the changes in cantilever deflection. Also, the power fed to two probes, one on the sample surface and one away from the sample surface can be compared to create a differential signal. The differential signal is used either (1) to produce localized analysis plots versus temperature that provide calorimetric or temperature dependent information at a specific position on the sample, or (2) to construct an image whose contrasts represent variations in thermal conductivity and/or diffusivity across a scanned area.

The general acceptance of this technique has been greatly hampered by the commercially available thermal probes having a tip diameter in the order of 3 microns which restricts the spatial resolution to this regime. Currently available Micro-TA probes are typically fabricated from fine wire, and the sharpness that can be achieved is limited. There are several fields, the two most prominent of these being Semiconductors and Polymers, where a spatial resolution of sub 500 nm will give information to scientists that could lead to revolutionary breakthroughs in scientific understanding and corresponding technology breakthroughs.

Probes having tips sharper than those made from fine wire can be produced from silicon, silicon nitride and other materials using microfabrication techniques such as used to make conventional SPM cantilever probes. Heating elements can be added to the cantilever. The heating element, which can be heated through resistive, inductive, or other heating approaches, may be produced on a cantilever body in a number of ways. One approach, described in U.S. Pat. No. 6,932,504, is to deposit metal film traces, such as used in normal semiconductor manufacturing for interconnects. This approach does not allow for suitably high temperatures. The low resistance of most metal films will require a significant current in order to achieve any reasonable heating. If there are any defects in the film or any contact of the film to any other conductive surface the heating element can fail even at low temperatures and at higher temperatures the element will likely fail due to alloying, electro-migration, melting, or other failure mechanisms.

Another approach, used by researchers at IBM and other laboratories (see IEEE Journal of Microelectrical Mechanical Systems, Vol. 7, No. 1, March 1998, pp 69-78) is to dope portions of the cantilever using an ion implant process. The doped regions become electrically conductive. A high doping can be used for conductive traces which connect to a heating element. The heating element can be doped at a lower level, resulting in a higher resistance, thus constraining the resistive heating to just the area of lower doping. Such an approach produces heaters that can achieve very high temperatures on probes with sharp tips. The doping process lends itself well to manufacturing the cantilever using conventional microfabrication processes, as implanting is a common step in silicon processing. However all current examples of thermal probes with implanted heating elements have the probe tip and the heating element overlap. This, for reasons that will be explained below, results in a very short, typically 1 micrometer or less in length, tip. Such a short tip is suitable for some applications, but in general, use of such a short tip constrains the probe to interrogating surfaces with topography having roughness less that the length of the tip, thus unduly limiting the application of the technique. Another benefit to having a longer tip is that the technique can be used to measure film thicknesses and thermal properties of thin films or multilayer films. The probe, if sufficiently long can melt through one layer and interrogate a layer below.

Thus the object of this invention is the design of a probe that can perform nanoscale thermal analysis with a spatial resolution of less than 500 nm and is applicable over a wide range of sample surface topography.

BRIEF SUMMARY OF THE INVENTION

The invention is a microfabricated thermal probe, which includes a planar cantilever having a free end and a fixed end; a probe tip, which narrows from a base to a sharp end, with the end extending out of the plane of the cantilever and the base located near the free end of the cantilever; at least two separate electrically conductive traces formed by an implant process on the cantilever and; at least one heating element with an active area, formed by an implant process on the cantilever, electrically connected to and bridging the traces. The key aspect of the probe design is that there is no spatial overlap between the base of the probe tip and the active area of the heating element.

In one embodiment, the cantilever is a single lever arm. In a preferred embodiment the cantilever is formed from two lever arms joined by a cross piece between the arms near the free end. Each arm is implanted to form a conductive trace, and the probe tip base and heating element are carried on the cross piece.

In a version of the probe, the probe tip length from base to end is preferably >3 microns, but typically less than 15 microns. The heating element is >50% of the total electrical resistance of the trace-heating-element circuit, preferably >90% and the total electrical resistance of the trace-heatingelement circuit is between 50 Ohms and 50 kohms, preferably between 400 Ohms and 8 kohms.

BRIEF DESCRIPTION OF THE DRAWINGS

The invention will be better understood by referring to the following figures.

DETAILED DESCRIPTION OF THE INVENTION

Figure 1:
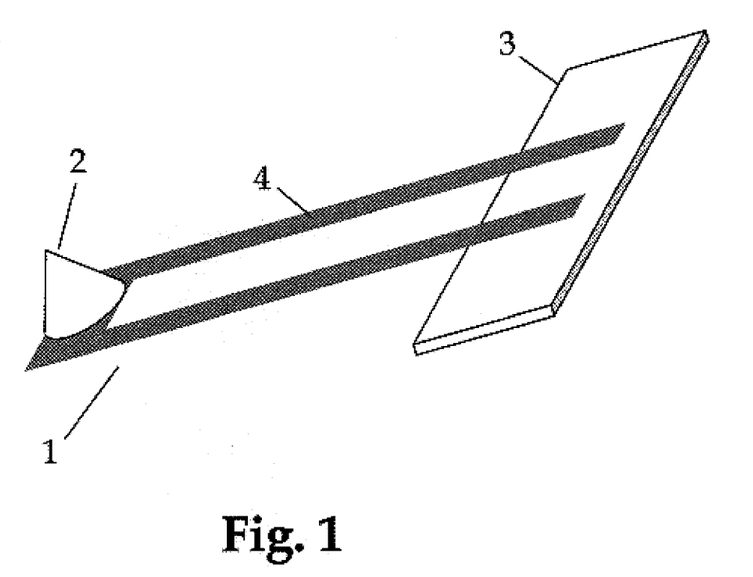
FIG. 1 illustrates a thermal probe cantilever of the prior art, probe tip not to scale.

FIG. 1 shows schematically a cantilever probe with an integral resistive heater. The figure and all of the remaining figures are drawn to illustrate various features of the invention. It is to be understood that the figures are not to scale, particularly the dimensions of the probe tip, which are in fact less than 10% typically of the cantilever length-width dimensions, so drawing the tip to scale would diminish the illustrative value of the drawings. The novel lever is suitable for use as the probe in many varieties of SPM.

In FIG. 1, cantilever 4, in this case consisting of two parallel arms with a cross piece at the free end, extends from substrate 3. Probe tip 2 extends out of the plane of the lever and is typically situated near the free end of the lever. Although two parallel arms with a cross piece is the configuration shown in the drawings, other configurations are also possible and known, such as triangular levers, both one piece or two arms, and one-piece solid rectangular levers. The shape of the lever is not part of the novelty of the invention.

A heating circuit, consisting of two conductive traces bridged with a heating element, is shown at 4. All known microfabricated thermal probe levers have the probe tip base residing directly on top of the heating element. For the case where the heating circuit is formed by implant-doping areas of the lever to form the circuit elements, the existing arrangement leads to restrictions on the tip, which severely limits the applicability of the thermal probes.

Figure 2:
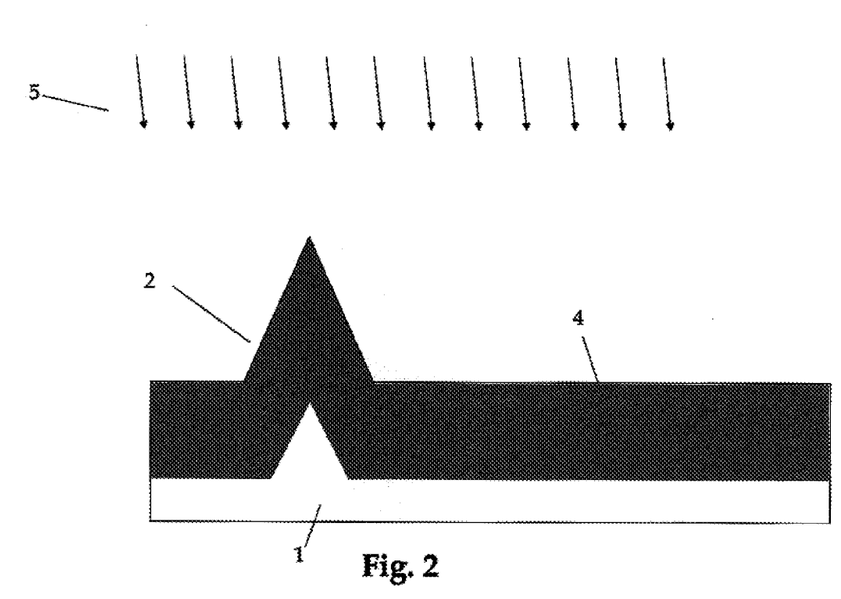
FIG. 2 shows an exemplary implanted region in cross section of the prior art lever.

The problem is illustrated in FIG. 2. The depth that the heating circuit implant layer 4 depth extends into the surface of the lever 2 depends upon several factors including the shape of the cantilever surface. The implant process is typically performed by exposing one plane of a semiconductor surface to dopant ions shown schematically as the arrows at 5. When dopants are presented to a topographic feature such as the sharp probe tip, the dopants will diffuse into the tip in a non-uniform manner, as shown, rendering the preferred probe heating operation impossible. Non-uniform doping leads to non-uniform heating. Non-uniform heating can create reliability problems as some areas will be hotter than others and more prone to failure. Moreover it is difficult to know the temperature of the tip-sample interface if the tip is non-uniformly hearted. The type of doping profile created by doping an angular feature such as the probe tip causes non-linearity in the voltage/resistance curve associated with the heating circuit, making some applications of Micro-TA difficult. Although there are several methods for producing tips on microfabricated levers in a batch fabrication mode, the sharpest and therefore highest spatial resolution tips, are produced by a process that etches away material, leaving the tip. Therefore the tip etching has to be done before the implant step, if the tip height is any reasonable fraction of the implant depth so as to achieve a uniform implant across the surface of the cantilever. So as shown in the cross-sectional view, the heating element in fact isn't under the tip, it is on the tip and is non-uniform. The result is that to achieve suitable heating characteristics, if the heating element is implanted on the tip, the tip is restricted in terms of geometry and aspect ratio. As described above, tips have been limited to about one micron or so in height before the non-uniform doping becomes unacceptable, which restricts the application of Micro-TA to very flat surfaces. Also, on a conductive surface, current can flow from the tip into the sample surface which is an undesirable effect in this application.

Figure 3:
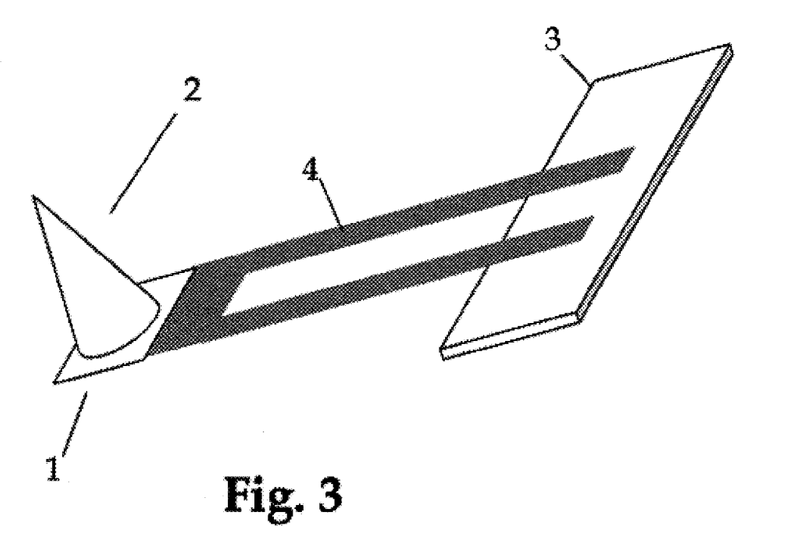
FIG. 3 shows a thermal probe cantilever according to the invention, probe tip not to scale.
Figure 4A:
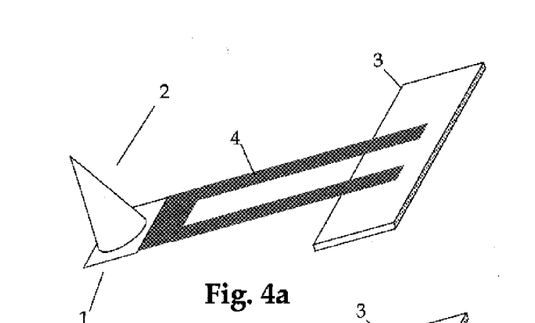
FIG. 4 shows some exemplary cantilever shapes
Figure 4B:
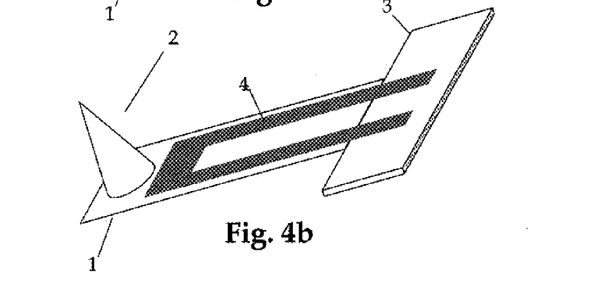
Figure 4C:
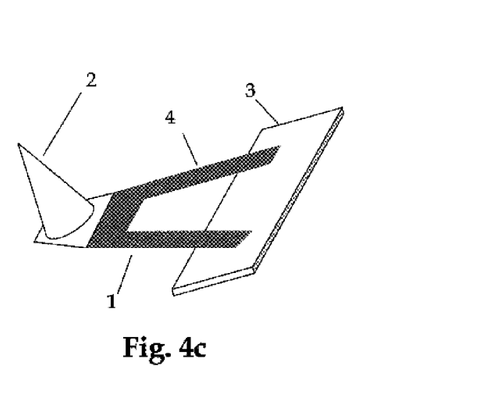
Figure 5:
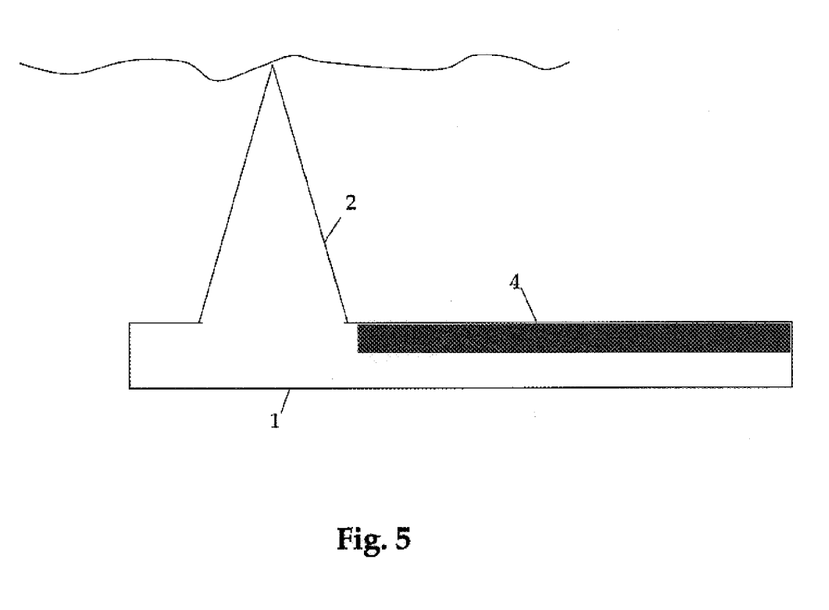
FIG. 5 shows the heater area in cross section of the novel thermal probe.
Figure 6:
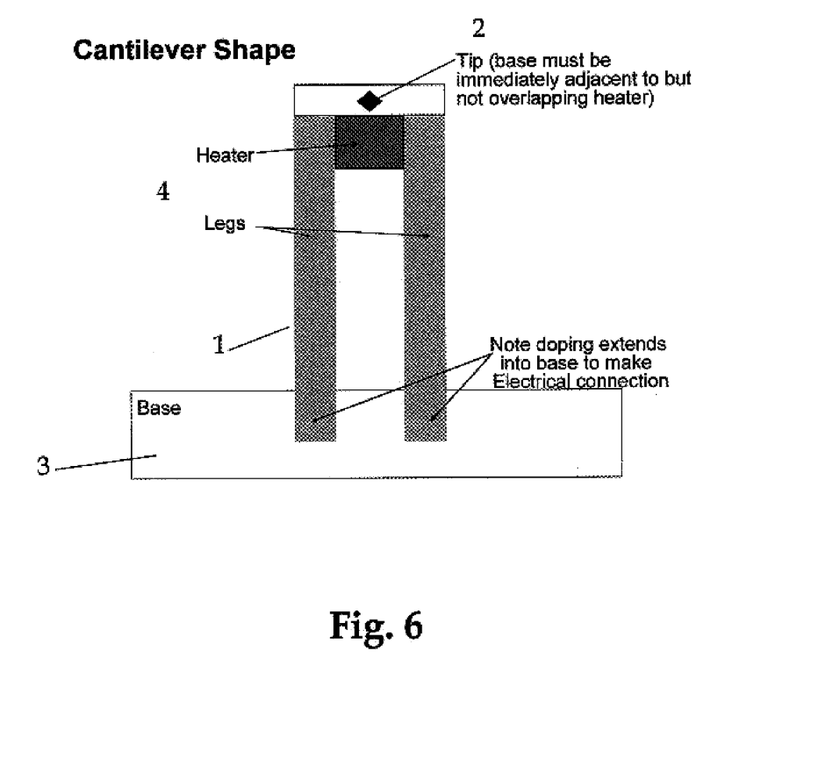
FIG. 6 shows the details of the doping of a probe according to the invention.

The inventors have discovered, as shown in FIG. 3, that the heating circuit 4 can be implanted such that the heating element is adjacent to, but not overlapping the tip 2, thereby eliminating the problems described above. For clarity, the heating element is shown as a simple rectangle, offset from the tip. However it is to be understood that the active area of the heating element and the doped region are not necessarily the same. Practitioners of the art will appreciate that the doping profile and heating element geometry can be designed so that the majority of the current flow, and therefore the heating action, take place in an active area of the doped region. So in all of the figures and following discussion it is to be understood that this active area portion of the implanted region is the heating element. The heating element is to be offset from the tip, not necessarily the entire dopant implanted region, which may overlap the tip. In the novel probe design, the heater is located sufficiently close to the tip that heat will flow from the heater to the tip, thereby raising its temperature sufficiently to locally heat the underlying sample surface. The cantilever and heater must be designed such that there is a significant thermal link between the heater and the tip. A sufficient amount of heat must flow from the heater to the tip such that the tip temperature is raised sufficiently to locally heat the underlying sample surface. In the case where the low doped highly resistive cantilever is to be used as a temperature sensor, then the heater element must be close enough to the tip for heat to flow from the tip into the heater. Therefore, the cantilever must have high thermal conductivity, which for silicon, the preferred material, is adequate. The inventors have shown that for a silicon cantilever, with the active area of the heating element adjacent to the tip, within a distance achievable by silicon processing techniques, uniform heating of tips with lengths of up to 15 microns can be achieved. The etched silicon tips on such cantilevers are sharp enough to achieve the goal of thermal analysis with resolution <500 nm, and are high enough to accommodate a wide range of surface roughness. A preferred embodiment is now described, referring to FIGS. 6-8. Again the configuration of two parallel arms joined at the free end is preferred by the inventor, but no limitation in scope of the invention as applied to different shaped probes is implied. A partial sampling of possible probe shapes is shown in FIGS. 4a, 4b and 4c. Referring to FIG. 6, the substrate base 3 is undoped. Each leg of the circuit 4 is heavily doped to minimize resistance while the heating element is more lightly doped, so that most of the resistance of the circuit, and therefore most of the heating, is accomplished in the heating element. The tip must be immediately adjacent to the heater but with no overlap. The doping of the legs extends into the base to provide for electrical contact to the heater power source.

The following parameters have been found effective by the inventor:
1. The heating circuit (other than the heater) is preferably doped to achieve a surface concentration of dopants >5e19/cm$^3$, so as to achieve a resistance of less than 100 ohms.
2. The heater is >50%, preferably >90%, of the overall electrical resistance of the circuit.
3. The heater is preferably as uniformly doped as possible, and the two conductive legs as close to identical as possible.
4. The overall resistance of the heating circuit should be between 50 ohms and 50 kohms, preferably between 400 ohms and 8 kohms.

The dimensions of an exemplary probe of the preferred embodiment, as illustrated in FIG. 6 are given below:

| | |
|---|---|
| Length: | 300 microns |
| Half Width: | 20 microns |
| Spring Constant: | 0.05 to 1.5 N/m |
| Resonant Frequency: | 7-21 kHz |
| Thickness: | 2 +/− 1 microns |
| Tip Height: | >3 microns, tip heights of up to 15 microns Achievable |
| Heating element: | 10 × 20 microns |

Figure 7:
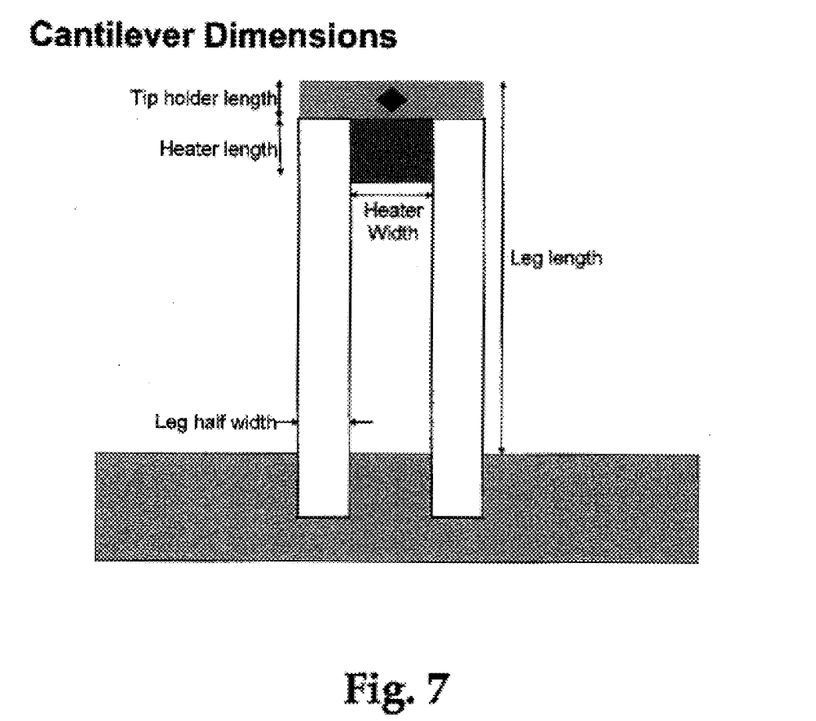
FIG. 7 shows the dimensions that are given for a preferred embodiment of the invention.
Figure 8:
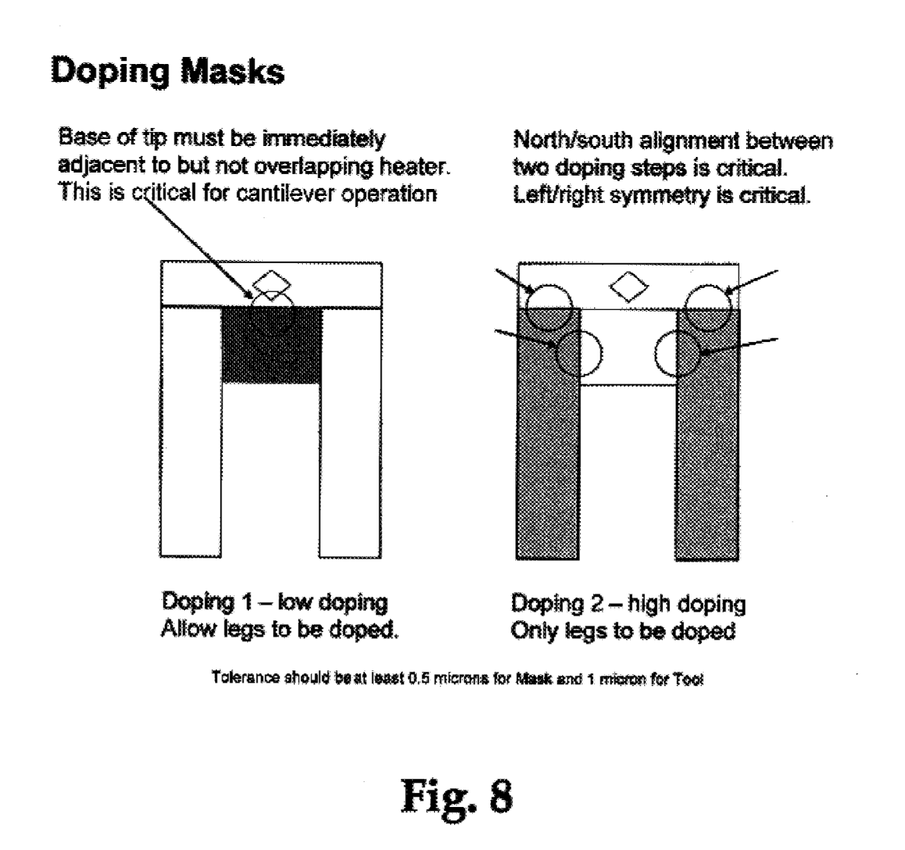
FIG. 8 shows the positioning and order of the doping steps.

FIG. 7 illustrates the doping process. In the first doping step, only the part of the lever supporting the tip is masked, and the remainder of the cantilever is lightly doped to the amount desired for the Heater. The inventors have used doping levels of 1e16/cm$^3$ to 5e18/cm$^3$ in the preferred embodiment. Then the heater and support area are masked, and the legs are doped heavily, >5e19/cm$^3$ to achieve low resistance. The circles indicate areas where mask alignment is critical to achieve both a balanced circuit and a probe tip tightly coupled to the heater.

A further advantage of this approach to making thermal probes of greater size is that this facilitates their use for thermally assisted nanosampling. In this technique the probe is placed on a solid surface and heated until the surface beneath the tip is rendered fluid. At this point the probe can be allowed to penetrate the sample and further manipulated, for example by moving the probe forward or backward, so as to encourage the fluid material to flow onto the tip so that, when the tip is retracted, a small amount of material remains on the probe (the nanosample). With small tips the scope for this is reduced because part of the cantilever might contact the surface and become contaminated by a broad region of the surface rather than the small area that is contacted by the tip of the probe. Because of this the spatial resolution of the sampling process would be greatly reduced. Furthermore, larger tips offer greater scope for customizing the shape and composition of the tip so as to encourage nanosampling. For example, a notch might be cut into the tip to create a nano-trowel that could scoop up small amounts of material; alternatively it could be made into the form of a tube that would work like a cookie-cutter to remove a nano-sized disk of material form the surface. The tip could be made of, or be coated with various materials such as metal which could be more easily chemically functionalized in order to encourage material, once rendered fluid by heating, to stick to the probe.

Once the nano-sample has been taken from a selected point it can then deposit the nano-sample into a suitable matrix so that it can be analyzed. For example, the probe could be placed on a small well containing frozen solvent. The tip is heated thus rendering the solvent fluid so that it can dissolve the material from the tip. The tip is then retracted leaving behind the nano-sample. This sample can then be put into, for example, a capillary electrophoresis-MS instrument and so be analyzed. Many alternative procedures exist, the tip might simply be placed on a surface that the nanosamples easily wets and so the tip is placed on the surface, heated to cause the nano-sample to flow which it then does onto the solid surface. The recipient of the nanosamples might be, for example, a glass bead that can then be dropped into a small quantity of solvent to dissolve the nanosamples so that it can be analyzed by a wide variety of techniques, including HPLC-MS. Alternatively the sample might be deposited onto a surface suitable for use in MALDI-MS analysis so that it is then placed in a MALDI instrument and analyzed (possible after suitable chemical processing such as digestion with enzymes). It could also be arranged that the nanosamples would be placed directly into suitable entry point to a chromatographic column.

The advantage of the nanosampling approach is that it brings much greater analytical power to analysis on a very small scale. In many forms of analytical microscopy, such as Raman microscopy, for example, have great difficult in coping with complex mixtures that contain many, possible hundreds, of components in a small volume. In such cases the Raman spectra cannot be readily interpreted because it can only give a single spectrum for the sum of all materials. Also Raman might not be the appropriate tool for analyzing the analyte of interest (the same comments apply to all other forms of spectroscopy). By nanosampling, chromatography can be used as part of the analytical process prior to analysis by some form of spectroscopy. This greatly increases the analytical specificity that can be achieved. With nanosampling all analytical techniques are potentially available to analyze a series of samples taken from a point of interest on a surface. In this way very much more detailed analytical information can be combined with sub-micron microscopy.

Thus a design for a novel thermal probe which is much more versatile than previous designs has been presented. Detail necessary to manufacture a particular embodiment of the probe has been presented as well. However variations on cantilever geometry and dimensions will occur to a skilled practitioner, both due to preference and exigencies of particular applications. Also variations on the geometry and implant pattern which achieve beneficial results will also suggest themselves to skilled practitioners. Such variations should be considered within the scope of the following claims.

We claim:
1. A microfabricated thermal probe, comprising;
   a substrate,
   a cantilever comprising a fixed end at the substrate and a planar surface extending from the substrate to a free end opposite the fixed end,
   a sharp probe tip, located at least substantially at the free end of the cantilever, the probe tip having a base that is coplanar with the planar surface of the cantilever the probe tip extending out and away from the plane of the planar surface of the cantilever to a sharp end,
   at least two separate electrically conductive traces formed by an implant process on the cantilever; and,
   at least one heating element with an active area, formed by an implant process on the cantilever, electrically connected to and bridging the traces, wherein;
   there is no spatial overlap between the base of the probe tip and the active area of the heating element, the active area of the heating element is located at the free end of the cantilever and adjacent to the tip and heats the tip; and, the resistance of the heating element is greater than twice the resistance of the traces.

2. The cantilever of claim 1 comprising a single lever arm.

3. The cantilever of claim 1 comprising two lever arms joined by a cross piece between the arms at or near the free end, wherein each arm is implanted to form a conductive trace, and the probe tip base and heating element are carried on the cross piece.

4. The probe of claim 1 wherein the probe tip length from base to end is greater than 3 microns.

5. The probe of claim 1 wherein the probe tip length is between 3 and 15 microns.

6. The probe of claim 1 wherein the heating element is greater than 90% of the total electrical resistance of a circuit formed from the traces and the heating element.

7. The probe of claim 1 wherein the total electrical resistance of the trace-heating-element circuit a circuit formed from the traces and the heating element is between 50 Ohms and 50 kohms.

8. The probe of claim 7 wherein the total electrical resistance of a circuit formed from the traces and the heating element is between 400 Ohms and 8 kohms.

* * * * *